United States Patent [19]

Farr

[11] Patent Number: 4,457,563
[45] Date of Patent: Jul. 3, 1984

[54] ANTI-SKID HYDRAULIC BRAKING SYSTEMS FOR VEHICLES

[75] Inventor: Glyn P. R. Farr, Warwickshire, England

[73] Assignee: Lucas Industries Public Limited Company, Birmingham, England

[21] Appl. No.: 433,232

[22] Filed: Oct. 7, 1982

[30] Foreign Application Priority Data

Oct. 13, 1981 [GB] United Kingdom ............... 8130883

[51] Int. Cl.³ .............................................. B60T 8/02
[52] U.S. Cl. ...................................... 303/92; 303/115
[58] Field of Search ............... 303/115, 119, 116, 117, 303/113, 114, 61–63, 68–69, 10–12, 92; 188/181 A, 181 R

[56] References Cited

U.S. PATENT DOCUMENTS 3,922,021 11/1975 Every ................................ 303/92 X
3,981,543 9/1976 Atkins ................................... 303/92

*Primary Examiner*—Douglas C. Butler
*Attorney, Agent, or Firm*—Scrivener, Clarke, Scrivener, and Johnson

[57] ABSTRACT

An anti-skid braking system incorporates a modulator assembly through which fluid from a source is supplied to a brake. The modulator assembly comprises a de-boost piston working in a bore in a housing, an expander chamber connected to the brake and defined in the bore between one end of the piston and a first valve, and a second valve for controlling the application to the piston of support fluid to determine the relative position of the piston in the bore, the second valve being manipulated in response to a skid signal. The operation of the first valve is controlled independently of the piston by a flow-control regulating valve which is arranged to open the first valve upon failure of a supply of support fluid irrespective of the position of the de-boost piston.

8 Claims, 5 Drawing Figures

ANTI-SKID HYDRAULIC BRAKING SYSTEMS FOR VEHICLES

SPECIFIC DESCRIPTION

This invention relates to anti-skid hydraulic braking systems for vehicles of the kind in which hydraulic fluid from a source of hydraulic fluid under pressure is supplied to a wheel brake of a vehicle through a modulator assembly which is adapted to modulate the supply of fluid from the source to the brake in response to skid signals from skid sensing means, the modulator assembly comprising a de-boost piston working in a bore in a housing, an expander chamber connected to the brake and defined in the bore between one end of the piston and a first valve, the first valve being disposed between the source and the expander chamber, and a second valve for controlling the application to the de-boost piston of support fluid in a support chamber to determine the relative position of the piston in the bore, the second valve normally being so operative that the support fluid provides a biassing force for holding the piston in an advanced position in which the effective volume of the expander chamber is at a minimum value, and the first valve normally being open to provide communication between the source and the brake at least when the piston is in the said advanced position, and means responsive to a skid signal to manipulate the second valve in order to release the support fluid thereby reducing the biassing force whereafter the piston can move away from the advanced position and into a retracted position in which the effective volume of the expander chamber is increased thereby reducing the pressure applied to the brake.

In known anti-skid braking systems of the kind set forth operation of the first valve is controlled directly by the de-boost piston, conveniently by a mechanical connection, and the first valve is held in a fully open position against a valve biassing force when the piston is in its advanced position. The first valve is permitted to close as the de-boost piston retracts from its advanced position to reduce the pressure applied to the brake in response to the skid signal, and is held firmly closed by the difference in pressure between the brake and the source until such time as the de-boost piston has returned substantially to its advanced position, whereupon the pressure applied to the brake will be restored and the first valve will be re-opened. In such systems there is a danger that a failure in an auxiliary pressurised support system supplying the support fluid may permit the de-boost piston to retract in response to a relatively low brake pressure so that the first valve closes or remains closed, thereby preventing the generation of adequate pressure in a line from the modulator assembly to the brake.

Known solutions to this problem include the use of a strong spring to bias the de-boost piston towards its advanced position to prevent the first valve from closing until adequate pressure has been applied to the brake, or the use of a normally-closed by-pass valve in parallel with the first valve and permitted to open only upon loss of adequate pressure in the auxiliary pressurised support system. Unfortunately a sufficiently strong spring tends to be unacceptably large and heavy, whilst by-pass valves are inherently unreliable.

In other known anti-skid braking systems both valves are solenoid-controlled in response to electrical skid signals and both valves are operated simultaneously. Thus, at the termination of a skid signal the first valve re-opens before the de-boost piston is able to return fully to its advanced position and a surge of pressure from the source to the brake may occur.

According to our invention an anti-skid hydraulic braking system of the kind set forth incorporates pressure-responsive means for controlling operation of the first valve and adapted to open the first valve upon failure of the support fluid and irrespective of the position of the de-boost piston.

This provides a fluid safe facility by ensuring that the brakes will be re-applied automatically in the event of failure of the support fluid during a skid cycle when the first valve would normally be closed.

The pressure-responsive means preferably comprises a flow-control regulating valve through which the support fluid from the supply, suitably an hydraulic accumulator, is supplied to the support chamber, and the flow-control regulating valve can act directly on the first valve itself or control it remotely by manipulation of a control piston.

Some embodiments of our invention are illustrated in the accompanying drawings in which.

Figure 1:
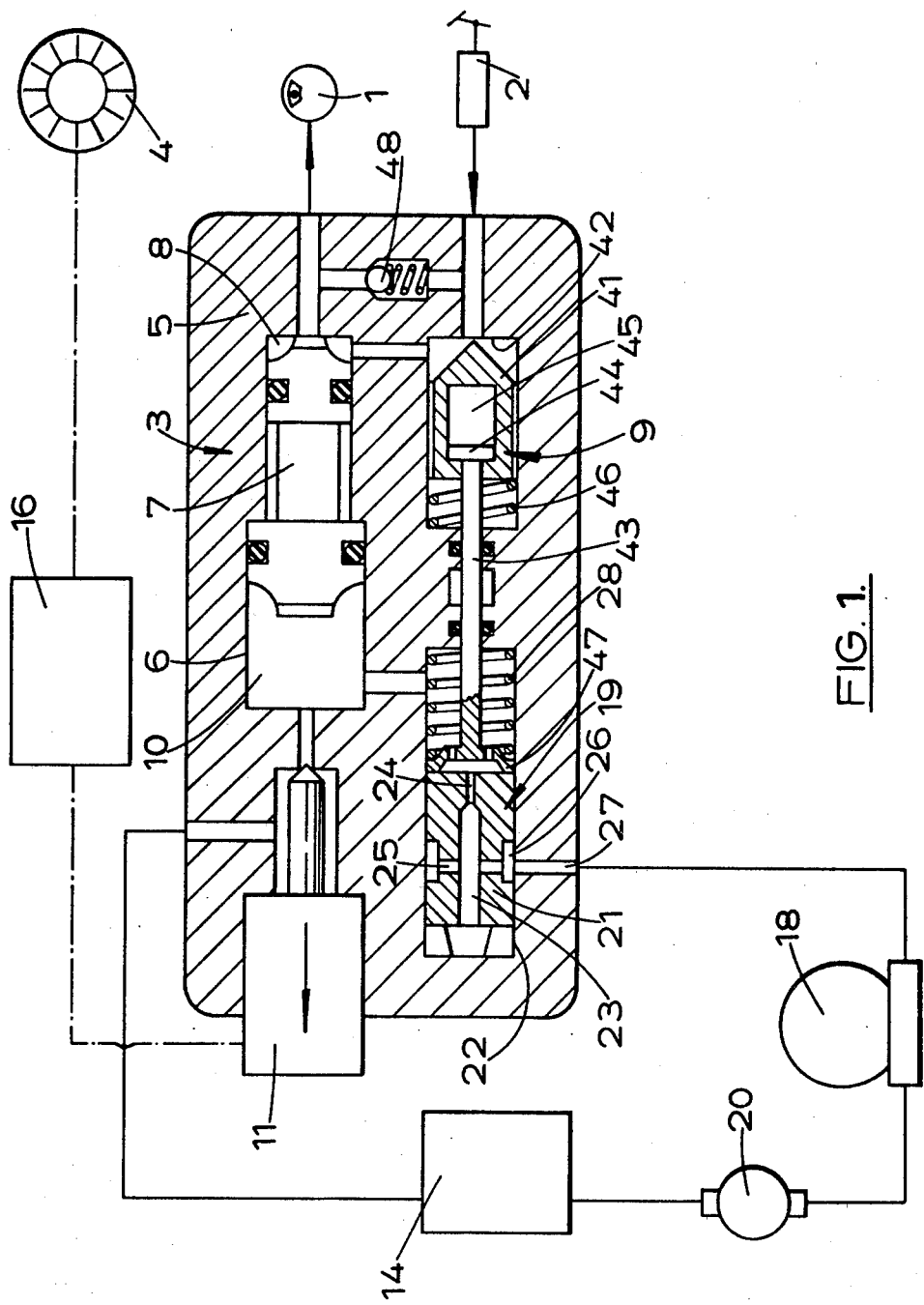
FIG. 1 is a layout of a first anti-skid hydraulic braking system.

In the anti-skid braking system illustrated in FIG. 1 of the accompanying drawings a wheel brake 1 is adapted to be applied by a pedal-operated master cylinder 2 through a modulator assembly 3 which is responsive to skid signals from a sensor 4 for sensing the speed of rotation of the wheel braked by brake 1.

The modulator assembly 3 comprises a housing 5 having a stepped longitudinally extending bore 6 in which works a stepped de-boost piston 7, an expander chamber 8 defined in the bore 6 between the end of the piston 7 which is of smaller area and a first valve 9 for controlling communication from the master cylinder 2 to the brake 1 through the expander chamber 8, and a support chamber 10 defined in the bore 6 between the opposite end of the piston 7 and a second, solenoid-operated valve 11.

The system is provided with a power source constituted by the pump 12 and the motor 13 is replaced by an hydraulic accumulator 18 and with a fluid flow control regulating valve 19, which is disposed between the accumulator 18 and the support chamber 10. The accumulator 18 is charged by a pump 20 which, in turn, draws fluid from a reservoir 14 which, in the layout illustrated, is separate from the pump 20.

The flow-control regulating valve 19 comprise a spool 21 which works in a bore 22 in the housing 5 and is provided with a through-bore 23 terminating at its inner end adjacent to the support chamber 10 in a fixed orifice 24. A diametrical passage 25 traverses the bore 23 and its outer ends lead into an annular groove 26 which co-operates with a radial port 27 leading from the accumulator 18 to constitute a variable restrictor. In the position shown in the drawing the spool 21 is held by a spring 28 in a position of maximum flow.

The first valve 9 comprises a valve member 41 for engagement with a seating 42 and which is coupled to an axially extending stem 43 through a lost-motion coupling constructed by a head 44 slidably guided in a slot 45 in the valve member 41. A spring 46 having a load less than that of the spring 28 normally urges the valve member 41 into engagement with the head 44. The opposite end of the stem 43 has an enlarged-apertured head 47 which is urged by the spring 28 into engagement with the adjacent end of the spool 21 of the flow-control regulating valve 19 in which the fixed orifice 24 is provided. This in turn, acts to hold the spool 21 in a retracted position and the valve member 41 away from the seating 42.

A one-way valve 48 permits fluid supplied to the brake 1 to return to the master cylinder 2.

In the position shown in the drawing the valve 11 is closed and the valve 40 is open to allow the brake 1 to be applied normally from the master cylinder and with the de-boost piston 7 held in the advanced position by pressure from the accumulator 18 supplied to its end of greater area through the flow-control regulating valve 19.

When a skid signal is generated the solenoid-operated valve 11 opens to place the support chamber 10 in communication with the reservoir 14. Due to a pressure drop across the fixed orifice 24, the spool 21 moves rapidly away from its retracted position, and into an advanced flow-regulating position, to cause the valve member 41 to engage with the seating 42 and isolate the master cylinder 2 from the brake 1.

The loss of pressure in the support chamber 10 permits the de-boost piston 7 to retract, thereby relieving the brake-applying pressure.

At the termination of the skid signal when the valve 11 closes to isolate the support chamber 10 from the reservoir 14 and fluid from the accumulator 18 returns the de-boost piston 7 at a rate determined by the flow-control regulating valve 19 in accordance with the pressure drop across the orifice 24 and the load in the spring 28, to force the piston 7 to return the advanced position and re-apply the brake 1. The valve member 41 remains in engagement with the seating 42 since the spool 21 is still in the advanced position.

When the piston 7 reaches its advanced position the flow of fluid through the flow-control regulator valve 19 ceases, equalising the pressure at opposite ends of the spool 21 which then moves back into its retracted position due to the load in the spring 28, thus re-opening the valve 40 to re-establish communication between the master cylinder 2 and the brake 1 through the expander chamber 8.

Should the accumulator 18 fail during a skid cycle the pressure across the flow-control regulating valve 19 will equalise and the valve 40 will open. This will allow the brake pressure to rise and re-apply the brake 1 irrespective of the position of the de-boost piston 7 in the bore 6. Such an increase in brake pressure will not move the de-boost piston 7 due to the provision of a one-way valve (not shown) at the outlet from the accumulator 18.

The flow through the flow-control regulating valve 19 is determined by the force in the spring 28 and this force, divided by the area of the spool 21, determines the pressure drop across the orifice 24.

However, if the mean brake-applying pressure is high, it acts on the stem 43 through the valve member 41. This increases the force acting on the flow-control regulating valve 19 to give an increased rate of brake re-application. A low mean brake-applying pressure reduces this force and gives a slower rate of brake re-application.

Figure 2:
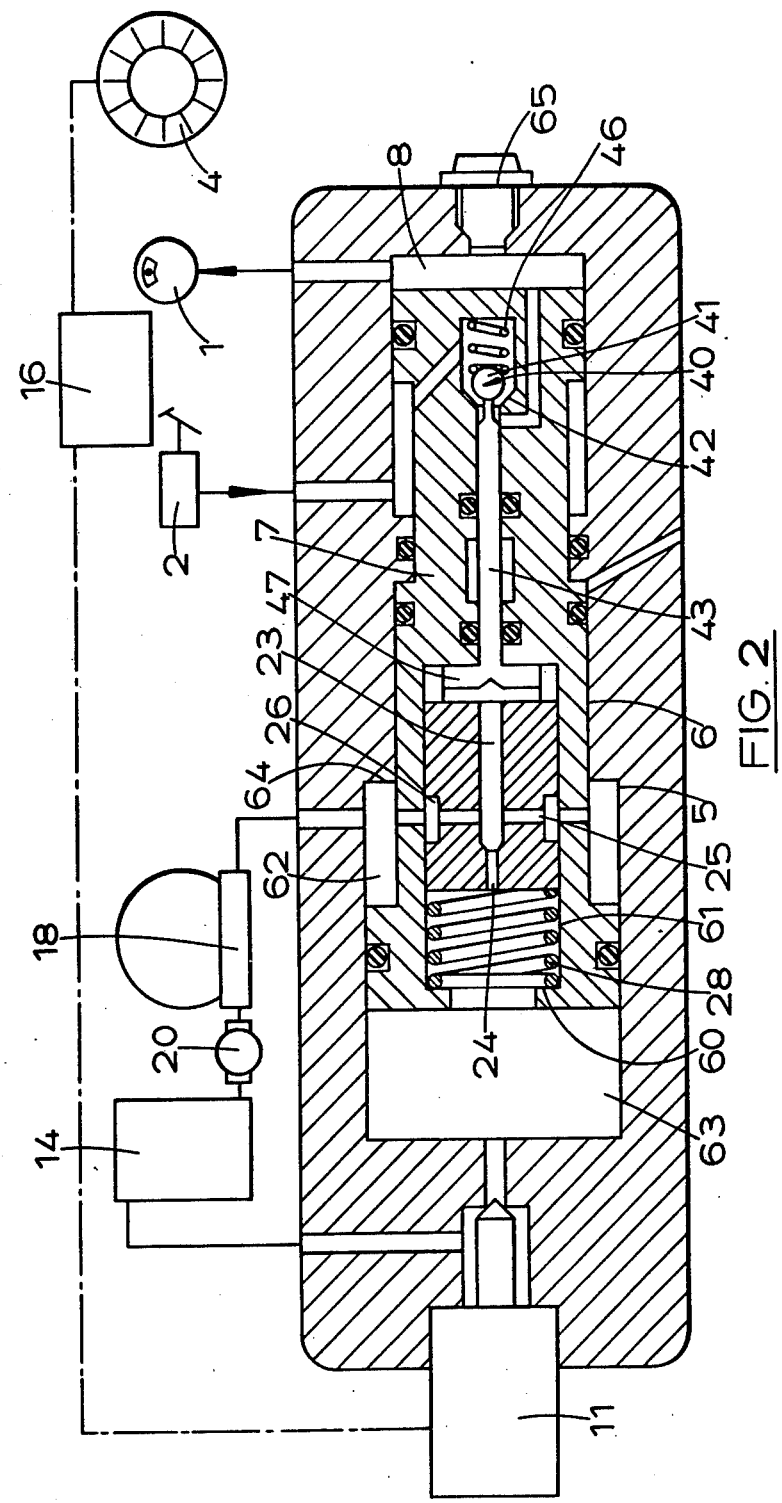
FIG. 2 is a layout of another anti-skid hydraulic braking system.

In the layout shown in FIG. 2 the de-boost piston 7 is of stepped outline and of integral construction, and the flow-control regulating valve 19 and the cut-off valve 40 are embodied in the de-boost piston 7 itself so that all the movable components of the modulator assembly 3 are accommodated within, or co-operate with, parts of a single bore 6 in the housing 5. This facilitates construction, manufacture, and assembly.

In this construction, however, the seating 42 of the cut-off valve 40 is provided in the de-boost piston 7, and the valve member 41 is separate from the stem 43 and is constituted by a ball. The ball 41 is normally held away from the seating 42 by the spring 28, which acts on the stem 43 through the spool 21 and, at its outer end, abuts against a shoulder 60 at the end of the piston 7 adjacent to the solenoid-operated valve 11. The position of the spool 22 is reversed and the spool 22 works in a portion of a stepped bore 61 in the piston 7, the stem 43 being guided to slide in a portion of the bore 61 which is of reduced diameter.

Support chambers 62 and 63 are defined by portions of the bore 6 on opposite sides of a shoulder 64 at the end of the piston 7 which is of greater area.

When the valve 11 is closed, the piston 7 is held in its advanced position by the pressure in the accumulator 18 which acts through the flow-control regulating valve 19 so that equal pressures are present in the chambers 62 and 63. Due to the difference in the areas of opposite sides of shoulder 64 the piston 7 is subjected to net force which holds it away from the chamber 63.

When a skid signal is generated the valve 11 opens and the chamber 63 is placed in communication with the reservoir 14. Due to the pressure drop across the fixed orifice 24, since accumulator pressure is still applied to the chamber 62, the spool 22 retracts against the load in the spring 28 to permit the ball 41 to engage with the seating 42 and the piston 7 itself retracts to increase the effective volume of the expander chamber 8 and relieve the pressure applied to the brake 1.

During this movement a slight reaction or feed-back will be felt on the pedal due to the entering volume of the retracting free end of the piston 7.

Whilst the skid signal is operative both the spool 22 and the piston 7 are held in their extreme retracted positions due to the pressure drop across the flow-control regulating valve 19.

At the termination of the skid signal the valve 11 closes to permit the pressure in the chamber 63 to increase thereby permitting the de-boost piston 7 to return, in a controlled manner, to its advanced position, thus re-applying the brake 1 gradually. When the piston 7 has returned to its fully advanced position these pressures are substantially equalised and the spool 22 can then move in a corresponding direction under the force in the spring 28 to re-open the valve 40.

Should the pressure applied to the brake 1 fall below a predetermined minimum value, say 30 p.s.i., then a pressure switch 65 may be provided to close the valve 11 so that the brake-applying pressure can be increased in a subsequent sequence as described above.

The construction and operation of the system of FIG. 2 is otherwise the same as that of FIG. 1 and corresponding reference numerals have been applied to corresponding parts.

In the embodiment described above with reference to FIG. 2, when the vehicle is travelling over a surface having a low coefficient of friction, after the solenoid of the valve 11 has been energized for a period determined by the controller 16, we may arrange for the solenoid to be pulsed subsequently to impart a re-application process at intervals in order to modify the effective brake re-application rate, for example to reduce the rate at which brake re-application pressure can increase.

Figure 3:
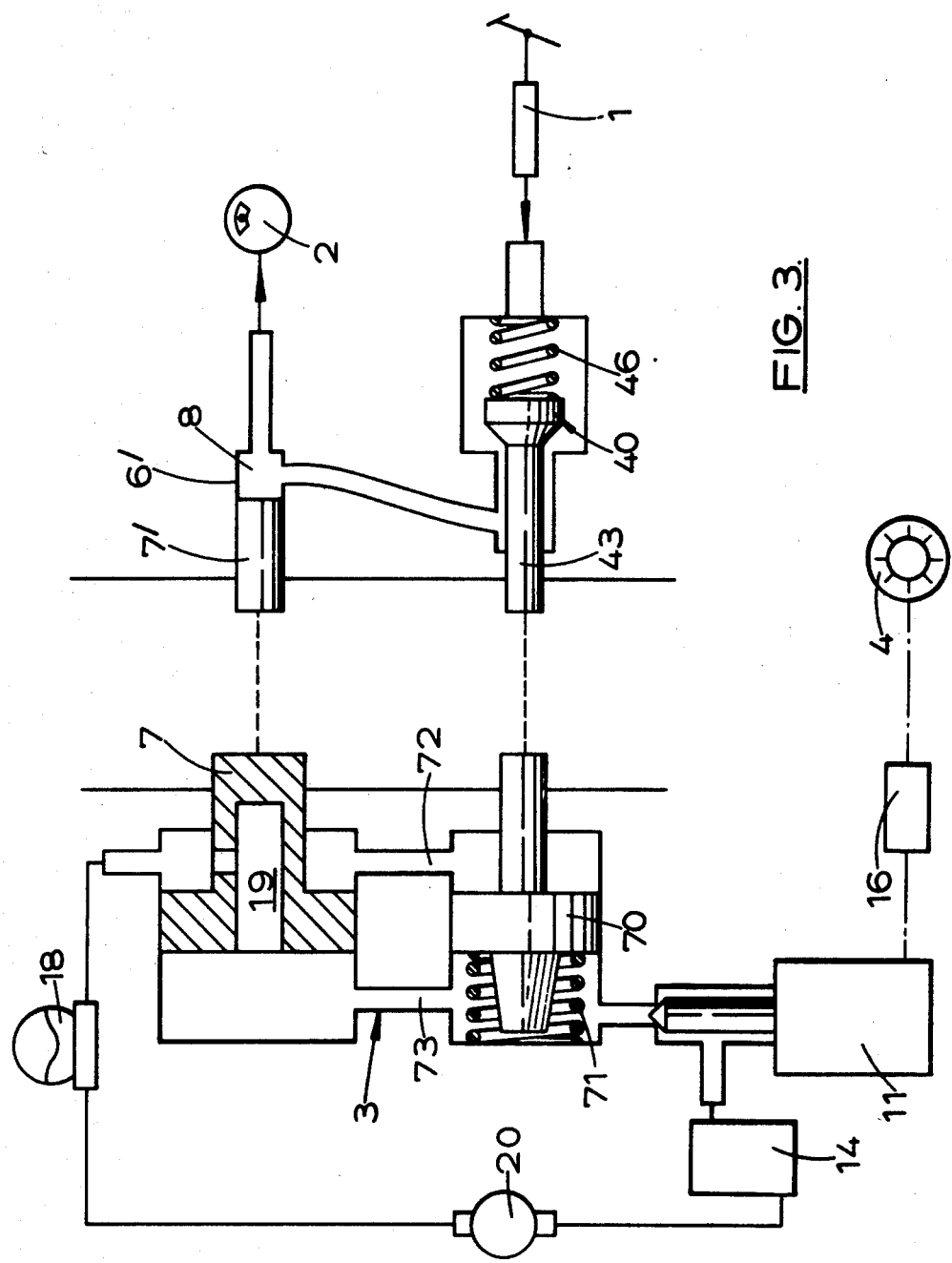
FIG. 3 is a layout of yet another anti-skid hydraulic braking system.
Figure 4:
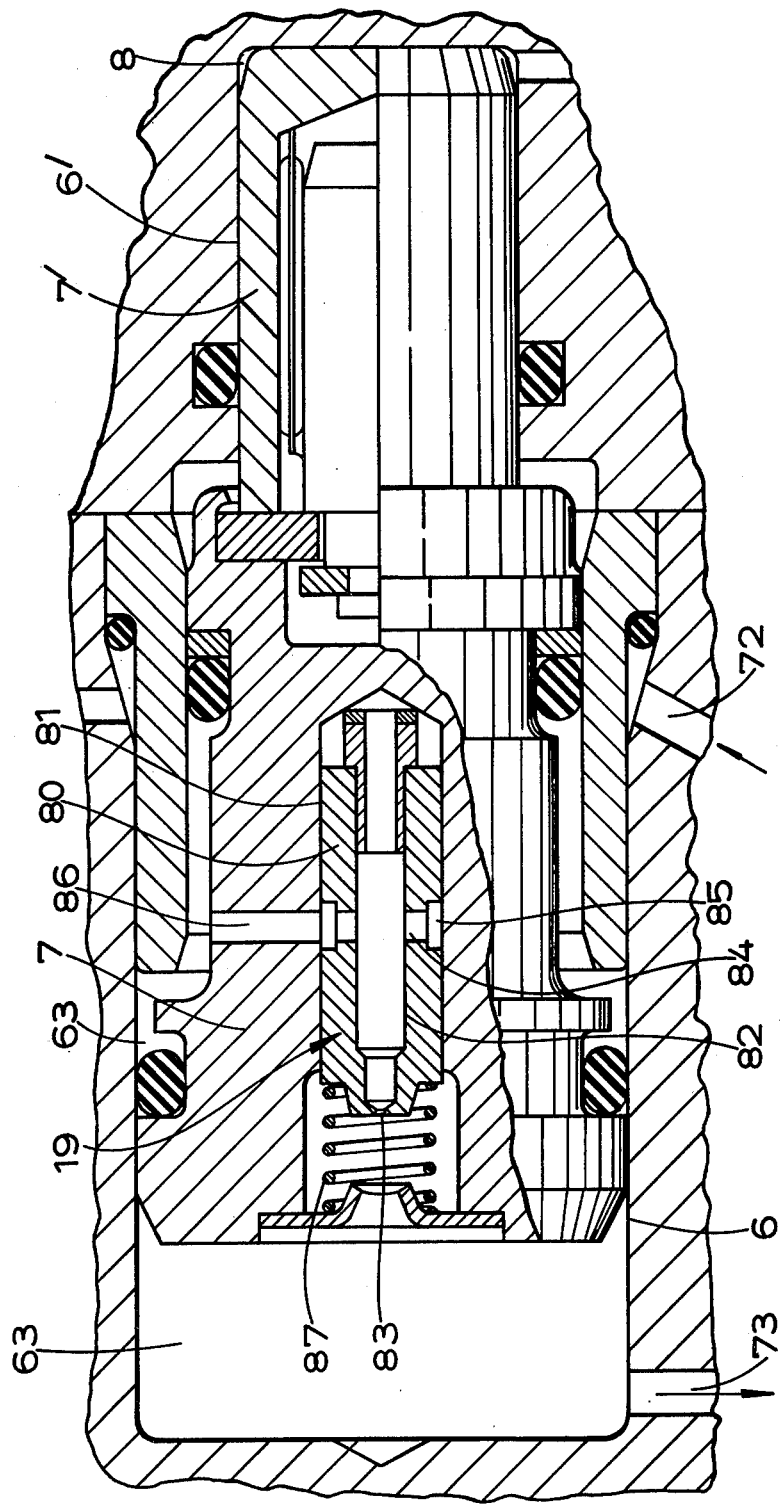
FIG. 4 is a longitudinal section through the upper portion of the modulator assembly of the layout of FIG. 3.
Figure 5:
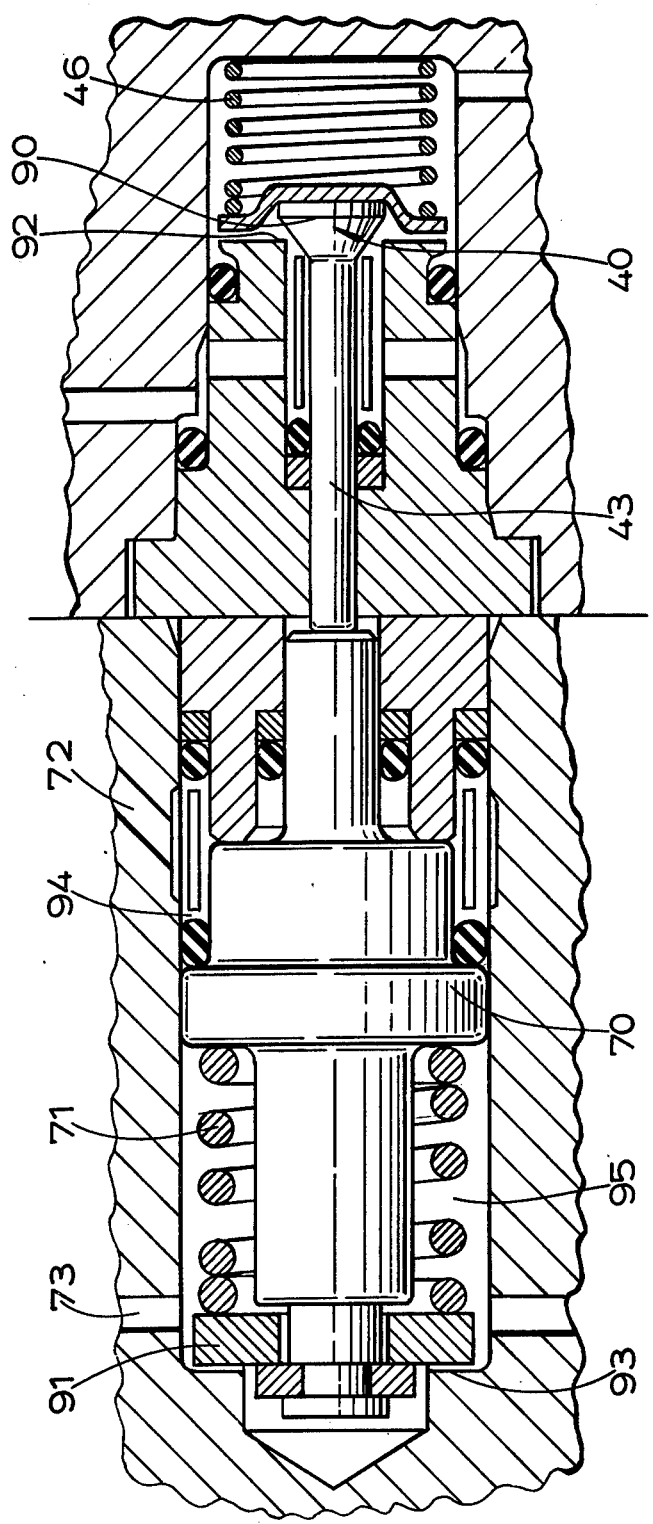
FIG. 5 is a longitudinal section through the lower portion of the modulator assembly of FIG. 3.

The layout of FIG. 3 shows, schematically, a modified modulator assembly of which upper and lower portions are shown in detail in FIGS. 4 and 5 respectively.

In the modulator assembly 3 the de-boost piston 7 is provided with an axial extension 7' of reduced diameter which works in an extension 6' of the bore 6 and of which the free end remote from the piston 7 is exposed to fluid in the expander chamber 8.

The flow control regulating valve 19 is embodied in the de-boost piston 7, but the cut-off valve 40, which controls communication between the master cylinder 1 and the brake 2 is remote from it. The operation of the cut-off valve 40 is controlled by a piston 70 which is normally held in an advanced position to hold the valve 40 open by a spring 71 with the piston 70 co-operating with the stem 43. The spring 71 acts on the end of the piston 7 remote from the cut-off valve 40 in opposition to the force in the spring 46. Normally opposite ends of the piston 7 are exposed to equal hydraulic pressures, with the pressure from the accumulator 18 being applied directly to the end adjacent to the valve 40, through a passage 72, and indirectly to the opposite, outer, end through the flow control regulator valve 19, the chamber 63 and a passage 73.

The flow-control regulating valve 19 comprises a spool 80 which works in a blind bore 81 in the piston 7 and is provided with a through-bore 82 terminating at its end remote from the closed end of the bore 81, in a fixed orifice 83. A diametrical passage 84 traverses the bore 82 and at its outer ends leads into an annular groove 85 which co-operates with a radial port 86 in the wall of the piston 7 leading to the accumulator 18 to constitute a variable orifice. In the position shown in the drawing the spool 80 is held by a spring 87 in a position of maximum flow.

The first valve 40 comprises a head 90 which is carried by the stem 43 which, at its inner end, is in freely separable engagement with the piston 70. The spring 71 acts between the piston 70 and an abutment plate 91 which is coupled to the piston 70 for movement through a limited distance. In the position shown in which the piston 70 is held in an advanced position with the head 90 spaced from a complementary seating 92, the abutment plate 91 is in engagement with a radial shoulder at the outer end of the piston 70. When the piston 70 is retracted against the force in the spring 71, the abutment plate 91 is carried with the piston 70 until its movement is arrested by a shoulder 73 on the housing whereafter the piston 70 can continue to retract through a further distance whilst the head 90 engages with the seating 92 and until the piston 70 abuts against the plate 91 with the piston 70 moving relatively away from the stem 43.

In the system of FIGS. 3 to 5 the valve 11 is normally closed and the valve 40 is normally open to allow the brake 2 to be applied from the master cylinder 1. The de-boost piston 7 is held in its advanced position by pressure in the support chambers 62, 63. Specifically pressure from the accumulator acts on the end of the piston 7 which is a maximum area through the flow-control valve 19 and in opposition to the pressure from the accumulator 18 which acts on the opposite side of the piston 7, over a smaller area.

Chambers 94 and 95 are similarly exposed to the pressures in the support chambers 62 and 63, and that net force, holding the head 90 away from the seating 92, is augmented by the force in the spring 71.

When a skid signal is generated the valve 11 opens and the chambers 95 and 63 are placed in communication with the reservoir 14. Due to the pressure drop across the fixed orifice 83, since accumulator pressure is still applied to the chambers 62 and 93, the spool 80 retracts against the load in the spring 87, the piston 70 retracts to permit the valve 40 to close and isolate the master cylinder from the brake 2, and the piston 7 and the extension 7' retract to reduce the pressure applied to the brake 2.

Whilst the skid signal is operative the spool 80, the piston 7 and extension 7' and the piston 70 are all held in their extreme retracted positions due to the pressure drop across the flow-control regulating valve 19.

At the termination of the skid signal the valve 11 closes to permit the pressure in the chambers 95 and 63 to increase by flow through the flow-regulating control valve 19. Initially this causes the de-boost piston 7 and the extension 7' to return, in a controlled manner, to their advanced positions, thus re-applying the brake 2 gradually. When the piston 7 has returned to its advanced position the pressures acting on opposite ends of the spool 80 and, as a consequence present in the chamber 62 and 63 and 94 and 95, are substantially equalised. At that point the piston 70 can then move under the force in the spring 71 to re-open the valve 40.

As in the contruction described above should the accumulator fail during a skid cycle the pressure across the flow-control regulating valve 19 will equalise as, in consequence, will the pressures acting across the pistons 7 and 70. The piston 70 is urged by the spring 71 into its advanced position to open the valve 40. This will allow the brake pressure to rise irrespective to the position of the de-boost piston 7 and 7' in the bore.

Separating the de-boost piston 7 from the first valve 40, and providing the de-boost piston 7 with an extension 7' has the advantage of enabling the system to incorporates a de-boost piston which has a relatively large travel to provide adequate expansion of the volume of the chamber 8, rapid brake de-pressurisation and a first valve 40 which has a relatively small travel. In addition, making the first valve 40 operable independently of the flow-control regulating valve 19 enables hysteresis due to seal friction to be reduced.

The contruction and operation of the system of FIGS. 3 to 5 is otherwise the same as that of FIG. 2 and corresponding reference numerals have been applied to corresponding parts.

I claim:

1. An anti-skid hydraulic braking system for vehicles comprising a wheel brake, a source of hydraulic fluid under pressure for applying said brake, skid sensing means for emitting skid signals responsive to behaviour of said wheel when said brake is applied, a modulator assembly for modulating the supply of fluid from said source to said brake in response to said skid signals from said skid sensing means, said modulator assembly comprising a housing having a bore, a de-boost piston working in said bore, a first valve, means in said housing defining an expander chamber between an end of said de-boost piston and said first valve, said first valve being disposed between said source and said expander chamber, means in said housing defining a support chamber to which said de-boost piston is subjected, and a second valve for controlling application to said de-boost piston of support fluid in said support chamber to determine the relative position of said de-boost piston in said bore, said support fluid normally being adapted to provide a biassing force for holding said de-boost piston in an advanced position in which the effective volume of said expander piston is at a minimum value, and said first valve being movable between an open position at least when said de-boost piston is in said advanced position and a closed position when said de-boost piston is displaced from said advanced position and into a retracted position, and means responsive to a skid signal to manipulate said second valve in order to release said support fluid thereby reducing said biassing force whereafter said piston can move away from said advanced position and into said retracted position in which said effective volume of said expander chamber is increased thereby reducing said pressure of fluid applied to said brake, wherein pressure-responsive means for controlling operation of said first valve are adapted to open said first valve upon failure of said support fluid and irrespective of the position of said de-boost piston.

2. A system as claimed in claim 1, wherein said pressure-responsive means comprises a flow-control regulating valve through which said support fluid from said supply is supplied to said support chamber.

3. A system as claimed in claim 2, wherein said flow-control regulating valve acts directly on said first valve itself.

4. A system as claimed in claim 2, wherein said flow-regulating valve comprises a housing having a bore, a spool working in said bore, said spool being provided with a through bore terminating at one end leading to said support chamber in a fixed orifice, and a passage traversing said bore and leading at its outer end into an annular groove which co-operates with a radial port leading from an accumulator to constitute a variable restriction, and a spring urging said spool into a position of maximum flow.

5. A system as claimed in 4, wherein said bore in which said spool works is remote from a bore in which the de-boost piston works.

6. A system as claimed in claim 4, wherein said bore in which the spool works is provided in the de-boost piston itself.

7. A system as claimed in claim 2, wherein said supply of support fluid comprises an hydraulic accumulator, and a pump for charging said accumulator draws fluid from a reservoir to which fluid from said support chamber is released by said second valve in response to a skid signal.

8. A system as claimed in claim 1, wherein a control piston is adapted to operate said first valve, and said control piston is, in turn, controlled by said flow-control regulating valve.

* * * * *